(12) United States Patent
Eswara et al.

(10) Patent No.: US 9,544,337 B2
(45) Date of Patent: Jan. 10, 2017

(54) CONVERGED MEDIA PACKET GATEWAY FOR A NOVEL LTE DATA AND VOICE CORE NETWORK ARCHITECTURE

(71) Applicant: Mavenir Systems, Inc., Richardson, TX (US)

(72) Inventors: Srinivas Eswara, Murphy, TX (US); Pardeep Kohli, Plano, TX (US); Ian Bjorn Maclean, Fairview, TX (US)

(73) Assignee: Mitel Mobility Inc, Richardson, TX (US)

( * ) Notice: Subject to any disclaimer, the term of this patent is extended or adjusted under 35 U.S.C. 154(b) by 69 days.

(21) Appl. No.: 14/477,002

(22) Filed: Sep. 4, 2014

(65) Prior Publication Data

US 2015/0063346 A1 Mar. 5, 2015

Related U.S. Application Data

(60) Provisional application No. 61/873,948, filed on Sep. 5, 2013.

(51) Int. Cl.
 *H04L 29/06* (2006.01)
 *H04W 92/04* (2009.01)

(52) U.S. Cl.
 CPC ......... *H04L 65/103* (2013.01); *H04L 65/1006* (2013.01); *H04L 65/1016* (2013.01); *H04L 65/1043* (2013.01); *H04L 65/80* (2013.01); *H04W 92/04* (2013.01)

(58) Field of Classification Search
 CPC .... H04L 65/80; H04L 65/103; H04L 65/1006; H04L 65/1016; H04L 65/1043; H04W 92/04

See application file for complete search history.

(56) References Cited

U.S. PATENT DOCUMENTS

| 8,565,150 B2 | 10/2013 | Hu et al. |
| 2003/0129983 A1* | 7/2003 | Bars .................... H04L 12/5695 455/445 |

(Continued)

FOREIGN PATENT DOCUMENTS

| FI | WO2009062951 | * 5/2009 | ............. H04L 12/14 |
| FI | WO2012173623 | * 12/2012 | ............. H04W 4/00 |

(Continued)

OTHER PUBLICATIONS

RCS VoLTE Interoperability Event 2012, Multivendor testing in global RCS/VoLTE Networks Oct. 2012.*

(Continued)

*Primary Examiner* — Habte Mered

(57) ABSTRACT

An Evolved Packet Core network comprises a converged media packet gateway control element including a GTP-C function of SGW, PGW, and P-CSCF and ATCF functions. The network further comprises at least one converged media packet gateway bearer element disposed remotely from the converged media packet gateway control element, in communication and under the management of the converged media packet gateway control element. The at least one converged media packet gateway bearer element includes SGW and PGW bearer plane terminating S1-U, and ATGW and IMS-AGW NAT functions.

27 Claims, 10 Drawing Sheets

(56) References Cited

U.S. PATENT DOCUMENTS

| | | | |
|---|---|---|---|
| 2009/0003358 A1* | 1/2009 | Son | H04L 12/5895 370/401 |
| 2010/0182974 A1* | 7/2010 | Barraclough | H04W 74/006 370/329 |
| 2011/0075675 A1* | 3/2011 | Koodli | H04L 12/14 370/401 |
| 2011/0122770 A1* | 5/2011 | Iovieno | H04L 63/00 370/235 |
| 2011/0170517 A1* | 7/2011 | Bakker | H04W 36/0033 370/331 |
| 2012/0173661 A1* | 7/2012 | Mahaffey | H04L 67/14 709/217 |
| 2012/0213140 A1* | 8/2012 | Olsson | H04W 8/08 370/311 |
| 2012/0300615 A1* | 11/2012 | Kempf | H04W 24/02 370/216 |
| 2013/0114432 A1* | 5/2013 | Haynes | H04W 76/041 370/252 |
| 2013/0136056 A1* | 5/2013 | Venkatraman | H04W 88/16 370/328 |
| 2013/0182644 A1* | 7/2013 | Kim | H04W 76/025 370/328 |
| 2013/0242942 A1* | 9/2013 | Stille | H04L 65/1016 370/331 |
| 2014/0022907 A1 | 1/2014 | Hu et al. | |
| 2014/0213219 A1* | 7/2014 | Mohebbi | H04W 92/02 455/411 |
| 2015/0055653 A1* | 2/2015 | Suryavanshi | H04L 65/1073 370/392 |
| 2015/0222753 A1* | 8/2015 | Noldus | H04L 65/1069 455/412.2 |
| 2015/0288529 A1* | 10/2015 | Kekki | H04W 48/18 370/259 |
| 2015/0319003 A1* | 11/2015 | Qiu | H04L 12/1482 455/406 |

FOREIGN PATENT DOCUMENTS

| | | | | |
|---|---|---|---|---|
| FR | WO2011045406 | * | 4/2011 | H04W 80/04 |
| FR | WO2012055769 | * | 5/2012 | H04W 48/18 |
| SE | WO2012095197 | * | 7/2012 | H04W 48/18 |
| WO | WO 2010/076043 A1 | | 7/2010 | |

OTHER PUBLICATIONS

GSM Association, Official Document IR.64, IMS Service Centralization and Continuity Guidelines, Version 4.0, pp. 1-14 (Jul. 4, 2012).

* cited by examiner

CONVERGED MEDIA PACKET GATEWAY FOR A NOVEL LTE DATA AND VOICE CORE NETWORK ARCHITECTURE

FIELD

The present disclosure relates to the field of wireless communications, and more particularly to a converged media packet gateway architecture for a novel LTE data and voice core network architecture.

BACKGROUND

The Third Generation Partnership Project (3GPP) unites six telecommunications standards bodies, known as "Organizational Partners," and provides their members with a stable environment to produce the highly successful Reports and Specifications that define 3GPP technologies. A mobile device, also called a User Equipment (UE), may operate in a wireless communication network that provides high-speed data and/or voice communications. The wireless communication networks may implement circuit-switched (CS) and/or packet-switched (PS) communication protocols to provide various services. For example, the UE may operate in accordance with one or more of a Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA: includes Wideband-CDMA (W-CDMA) and Low Chip Rate (LCR) cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS).

LTE (Long Term Evolution) is a new standard for wireless communication of high-speed data for mobile phones and data terminals. It is based on the GSM/EDGE and UMTS/HSPA (Universal Mobile Telecommunication System/High Speed Packet Access) network technologies, increasing the capacity and speed using new modulation techniques. The IP-based LTE network architecture, called the Evolved Packet Core (EPC) supports seamless handovers for both voice and data to cell towers with older network technology such as GSM, UMTS and CDMA2000. The LTE technology is adapted for a smooth evolution from earlier 3GPP systems.

BRIEF DESCRIPTION OF THE DRAWINGS

The present disclosure makes reference to a number of drawing figures listed below.

DETAILED DESCRIPTION

Figure 1:
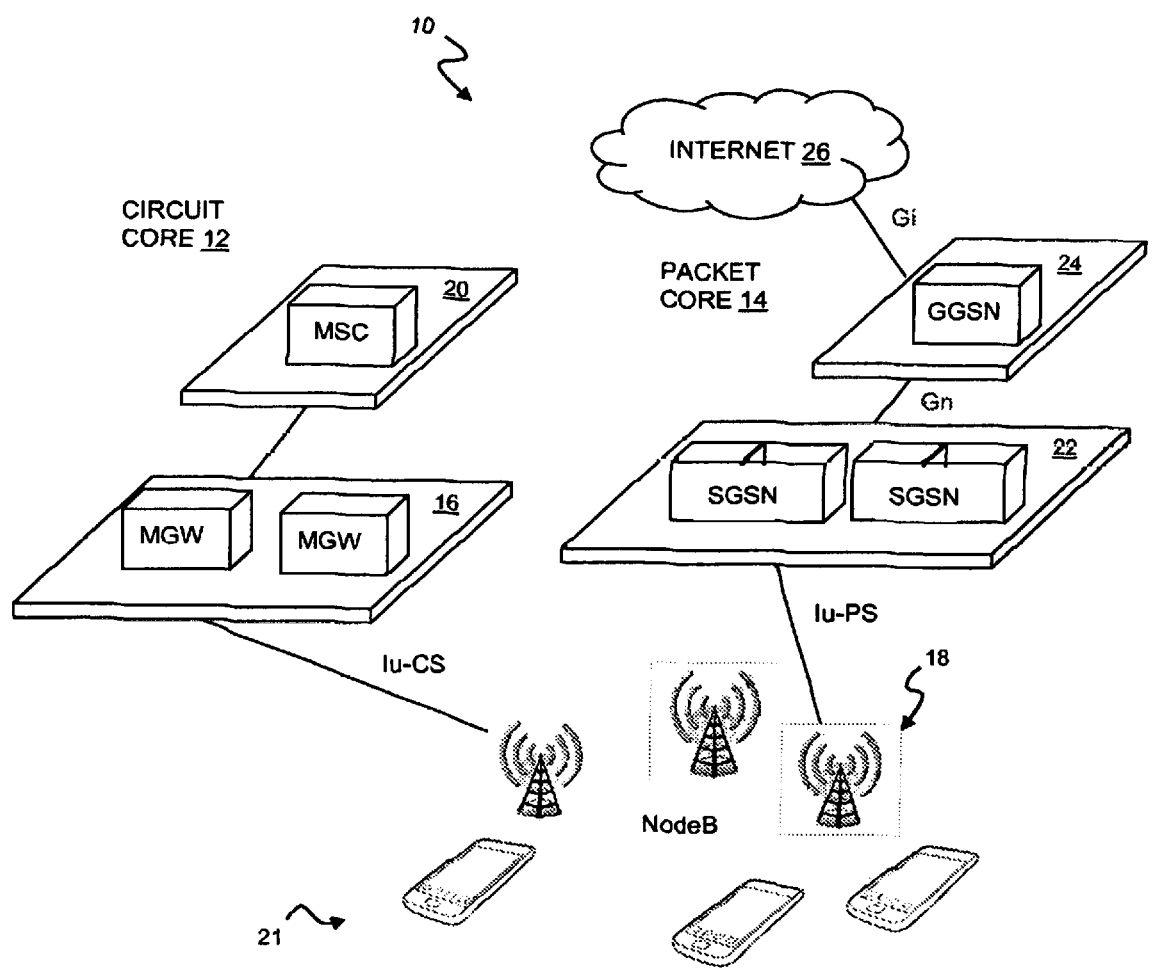
FIG. 1 is a simplified network architecture diagram of an exemplary Universal Mobile Telecommunication System (UMTS) network.
Figure 2:
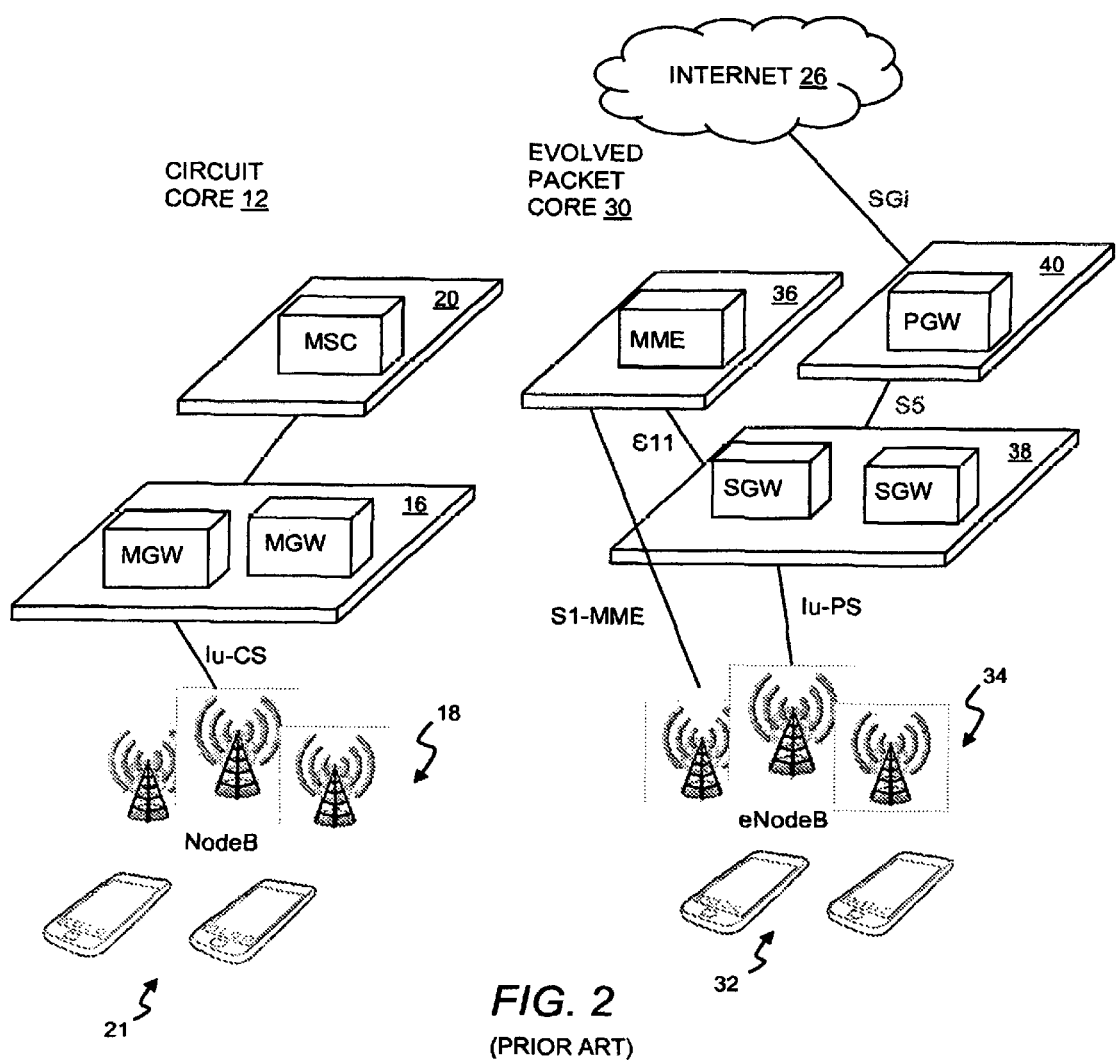
FIG. 2 is a simplified network architecture diagram of an exemplary Long Term Evolution (LTE) network.
Figure 3:
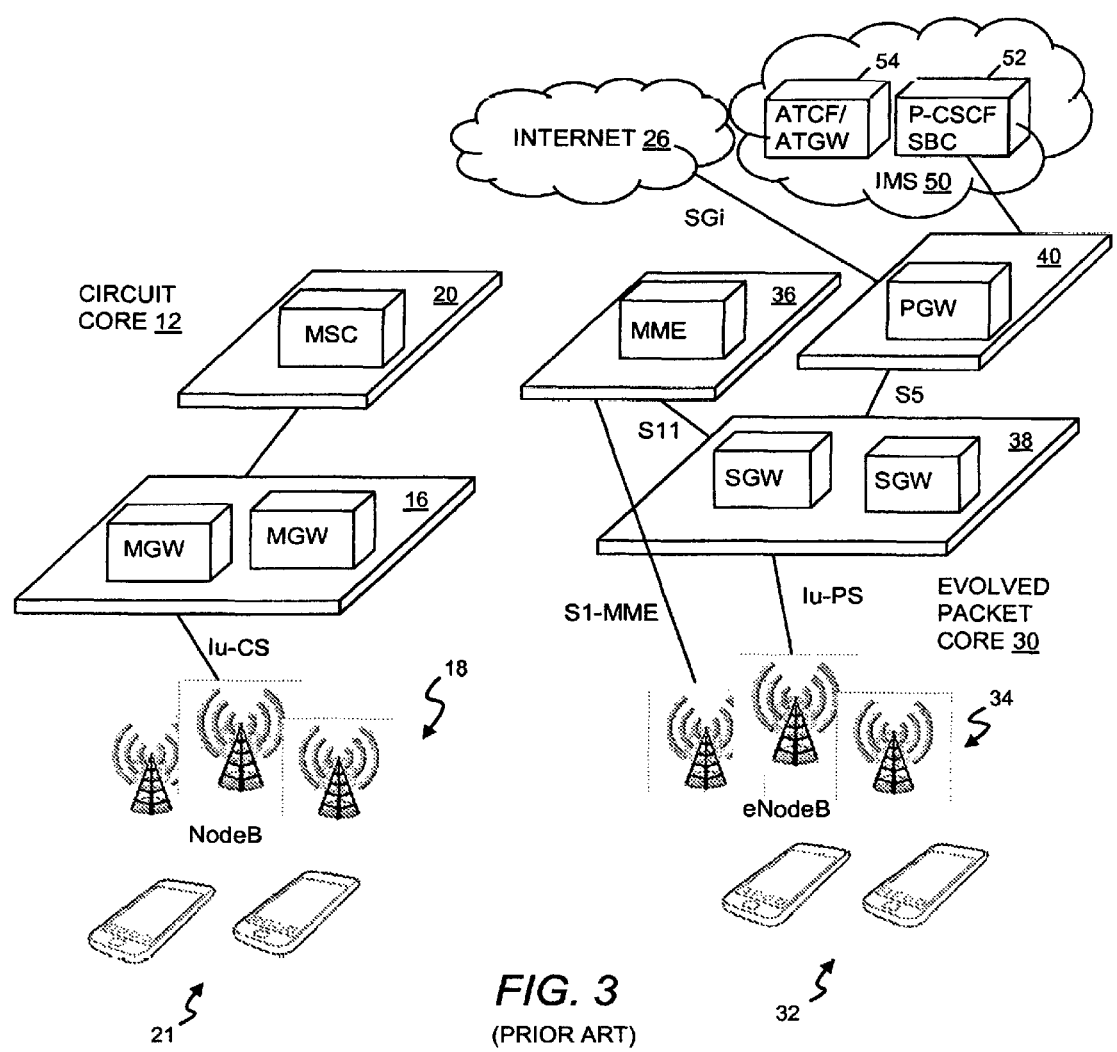
FIG. 3 is a simplified network architecture diagram for exemplary Voice Over Long Term Evolution (VoLTE)

FIGS. 1-3 show a progression of telecommunication network architectures. FIG. 1 is a simplified network architecture diagram of an exemplary Universal Mobile Telecommunication System (UMTS) network 10. UMTS is a third generation mobile cellular system for networks based on the GSM standard. Developed and maintained by the 3GPP (3rd Generation Partnership Project), UMTS is a component of the International Telecommunications Union (ITU) IMT-2000 standard set. UMTS uses Wideband Code Division Multiple Access (W-CDMA) radio access technology to offer greater spectral efficiency and bandwidth to mobile network operators.

UMTS 10 includes a circuit switched (circuit core) telecommunication network 12 and a packet switched (packet core) telecommunication network 14. The circuit core network 12 includes Media Gateways (MGW) 16 coupled to Base Transceiver Stations (NodeB) 18 via an Iu-CS interface. The MGW 16 uses open interfaces to connect to different types of nodes in the circuit core network and external networks. The circuit core network 12 further includes a Mobile Switching Center (MSC) 20 that controls MGW operations. The MSC 20 performs switching functions including call set-up, release, and routing.

The packet core network 14 is a General Packet Radio Service (GPRS) network that provides mobility management, session management, and transport for Internet Protocol packet services in GSM and WCDMA networks. The packet core network 14 includes one or more Serving GPRS Support Nodes (SGSN) 22 coupled to the NodeB 18 via an Iu-PS interface. The SGSN 22 is responsible for the delivery of data packets from and to the UEs 21 within its geographical service area. Its tasks include packet routing and transfer, mobility management (attach/detach and location management), logical link management, and authentication and charging functions. The SGSN 22 is further coupled to a Gateway GPRS Support Node (GGSN) 24. The GGSN 24 is responsible for the internetworking between the GPRS network and external packet switched networks such as the Internet 26 and X.25 network. The GGSN 24 converts the GPRS packets coming from the SGSN into the appropriate packet data protocol (PDP) format (e.g., IP or X.25) and sends them out on the corresponding packet data network.

In this disclosure, the UE is intended to cover a wide range of communication-capable devices now known or developed in the future. The UE may include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2 is a simplified network architecture diagram of an exemplary Long Term Evolution (LTE) network. LTE is commonly marketed as 4G LTE, is a standard for wireless communication of high-speed data for mobile phones and data terminals. It is based on the GSM/EDGE and UMTS/HSPA network technologies, increasing the capacity and speed using a different radio interface together with core network improvements. The standard is developed by the 3GPP (3rd Generation Partnership Project) and is specified in its Release 8 document series, with minor enhancements described in Release 9. The IP-based LTE network architecture, called the Evolved Packet Core (EPC) is designed to replace the GPRS Core Network, and supports seamless handovers for both voice and data to cell towers with older network technology such as GSM, UMTS and CDMA2000.

The Evolved Packet System (EPS) may include one or more UE 32 accessing the EPC 30 over an Evolved UMTS Terrestrial Radio Access Network (E-UTRAN), an access network in LTE. The E-UTRAN includes at least one evolved Node B (eNodeB) transceiver 34. The eNodeB 34 provides user plane and control plane protocol termination toward the UE 32. The eNodeB 34 may be connected to other eNodeBs via a backhaul (e.g., an X2 interface; not shown). The eNodeB 34 are also commonly referred to as a base station, a base transceiver station, a radio base station, a radio transceiver, a transceiver function, a basic service set (BSS), and an extended service set (ESS). The eNodeB 34 provides an access point to the EPC 30 for a UE 32.

The eNodeB 34 is connected by an S1-MME interface to a Mobility Management Entity (MME) 36 for control plane traffic. The MME 22 is a node in the control plane that processes the signaling related to mobility and security between the UE 32 and the EPC 30. Generally, the MME 36 provides bearer and connection management.

The EPC 30 further includes one or more Serving Gateway (SGW) 38, and a Packet Data Network (PDN) Gateway (PGW) 40. The gateway nodes 38 and 40 are in the user plane, and transport IP data traffic between the UE 32 and the external networks such as the Internet 26. All user IP packets are transferred through the SGW 38 and the PGW 40. The SGW 38 is the connection point between the radio-side and the EPC 30, and routes and forwards user IP data packets while also acting as the mobility anchor for the user plane during inter-eNodeB handovers, and as the anchor for mobility between LTE and other 3GPP technologies.

The PGW 40 is the connection point between the EPC 30 and the external packet data networks 26, and provides IP address allocation as well as other functions for the UE 32. The PGW 40 is the point of exit and entry of data traffic for the UE 32. The PGW 40 is connected to external networks 26. A UE 32 may have simultaneous connectivity with more than one PGW for accessing multiple Packet Data Networks (PDN). The PGW 40 performs functions such as UE IP address allocation, policy enforcement, packet filtering for each user, charging support, lawful interception, and packet screening. The EPC 30 includes other network nodes not explicitly described herein.

The interface between the SGW 38 and the PGW 40 is S5; the interface between the MME 36 and the SGW 38 is S11; and the interface between the PGW 40 and external data networks like the Internet 26 is SGi. It should be noted that the radio access network may communicate with the EPC via one or a combination of gateway nodes, including the PGW and SWG as shown, and a HRPD serving gateway (HSGW) not shown in the figure.

The hierarchical nature of LTE tends to centralize nodes from the UE to the Internet. The LTE hierarchical topology, primarily due to the requirement to maintain the IP address of the UE constant even as the UE moves either a short or long distance, can lead to inefficient media paths for both data and voice traffic. The LTE data path may involve very significant backhaul costs, and localized services such as caching local interest content may not be efficient. Centralized PDN GW or PGW leads to inefficient data path routing to cached and to non-cached content providers. Backhauling this large amount of low value data can be a big operating expenses drain on operator margins. Localizing the PGW reduces this impact but leads to higher capital expenditure, since PGW hardware tends to be proprietary and not very scalable on the low end. Distributing the PGW regionally leads to higher operating expenses due to management of these complex nodes at every site including connectivity, software upgrade, patch rollout, monitoring performance, etc. Typically, the PGW sites are limited due to high cost and to limit Internet Protocol (IP) POPs (Points of Presence) and connectivity. This leads to sub-optimal placement of cached data stores, which could have been optimized based on local interest, big data collection, etc.

FIG. 3 is a simplified network architecture diagram for exemplary Voice Over Long Term Evolution (VoLTE). The VoLTE scheme was devised as a result of operators seeking a standardized system for transferring traffic for voice over LTE. LTE is an all IP cellular system for carrying IP data traffic, and operators initially planned to carry voice traffic either by reverting to 2G/3G systems or by using VoIP in one form or another. It was recognized that it is necessary to have a viable and standardized scheme to continue to provide the voice and SMS services despite the falling revenue generated from these services. VoLTE became the solution. VoLTE is based on two separately introduces 3GPP standards—IP Multimedia Subsystems (IMS), first introduced in 3GPP UMTS Release 5, and Long Term Evolution (LTE) first introduced in the 3GPP UMTS Release 8. The VoLTE scheme for providing voice over an LTE system utilizes an IP Multimedia Subsystem (IMS) 50. The IMS is an architectural framework for delivering Internet Protocol multimedia services and enables a variety of services to be run seamlessly rather than having several disparate applications operating concurrently.

The IMS 50 includes a Proxy Call Session Control Function (P-CSCF) or Session Border Controller (SBC) 52 that interfaces with the EPC. The P-CSCF is the first IMS node encountered when a UE (User Equipment) is trying to establish a VoLTE call. The P-CSCF locates an Interrogating-CSCF (I-CSCF) for the user and the I-CSCF in turn locates an Serving-CSCF (S-CSCF) for the user.

To set up a VoLTE call, the UE first has have a default bearer in place. At power on, the UE sends an ATTACH REQUEST to the Mobility Management Entity (MME). The MME queries the Home Subscriber Server (HSS) to retrieve the subscriber's profile. The profile contains the user's default Access Point Name (APN), which for VoLTE calls is the IMS. The MME determines the appropriate Serving Gateway (SGW) and Packet Data Network Gateway (PGW) for the call. The eNodeB, the SGW and the PGW establish a default bearer and the PGW supplies the UE with an IP address. In addition to the UE's IP address, the PGW may also provide the P-CSCF IP address. When the attach procedure is complete, the default bearer is established, and the UE has an IP address for itself and the IP address of the P-CSCF.

Once attached to the LTE network, the UE initiates SIP registration. The UE forwards the SIP Registration message to the P-CSCF. The message contains the home domain of the UE and using this information, the P-CSCF consults a DNS server and identifies an I-CSCF in the UE's home network. The P-CSCF forwards the Registration request to the I-CSCF, and ultimately it reaches the S-CSCF.

The IMS standard requires an IPSec Security Association (SA) between the UE and the P-CSCF. The P-CSCF establishes the SA during the SIP registration procedure.

The P-CSCF is also involved in billing and policy control for the VoLTE call. Consider that the IMS network has no knowledge of the user's data flow and that the PGW has no knowledge of the signaling performed by the IMS nodes on behalf of the user. The IMS system and the LTE nodes produce Charging Data Records (CDRs), and deliver them to the billing system. With records coming from multiple sources, some reporting signaling and others reporting data usage, the control CDRs and the data CDRs need a method for reconciliation. This reconciliation is satisfied with the introduction of two identifiers: the GPRS Charging Identifier (GCID) created by the PGW and the IMS Charging Identifier (ICID) created by the P-CSCF. The P-CSCF passes the ICID to the PCRF, which in turn passes it to the PGW. The PGW passes the GCID to the PCRF, which passes it to the P-CSCF, which passes it to the remaining IMS nodes involved in billing. With both identifiers in hand, nodes that produce billing records place both IDs in the CDRs for the call.

The P-CSCF also delivers information to the PCRF that allows the PCRF to create the appropriate policy rules for the call. The P-CSCF extracts information from the SIP messages and sends it to the PCRF on the Rx interface using the DIAMETER protocol. This information allows the PCRF to determine the appropriate data rate, bearer type, QoS (Quality of Service) requirement, and gating control (packets allowed or disallowed) for the call. When the PGW is setting up the voice data path for the call, it queries the PCRF for the user's policy rules and sets the call rules appropriately.

The IMS 50 further includes Access Transfer Control Function/Access Transfer Gateway (ATCF/ATGW) 54. The ATCF acts as a media gateway controller for the ATGW. The ATGW acts as an anchor for the IMS media traffic to allow it to be switched quickly form the PS access network to the CS access network via the MSC. Further, responsibility for managing radio access handover is also delegated to the ATGW. Other IMS network nodes are not shown for the sake of brevity and clarity.

The peer-to-peer model fits poorly into the central bearer model, and results in inefficient and costly deployment. The placement of the P-CSCF/SBC 52 and ATCF/ATGW 54 determines how far the voice path will have to travel. The voice quality leased capacity can be very expensive per mile due to latency and jitter requirements. The large number of nodes in the bear path makes VoLTE core path significant less optimum than 3GPP R4 (Release 4) Mobile Switching Center/Media Gateway (MSC/MGW) deployment. The bearer for voice is very sensitive to latency, jitter of the transport as well as the nodes to be traversed. Simply putting the PGW and SGW close to the users will not solve the problem unless the SBC and ATGW are also close to the edge. Conversely, simply placing the SBC and ATGW at the edge with a centralized PDN GW also will not solved the problem. However, putting all of these elements (S-GW, PDN GW, SBC with IMS AGW, ATCF/ATGW at the edge is cost prohibitive due to the cost of these individual products as well as the operating expenses of managing the distributed deployment.

Figure 4:
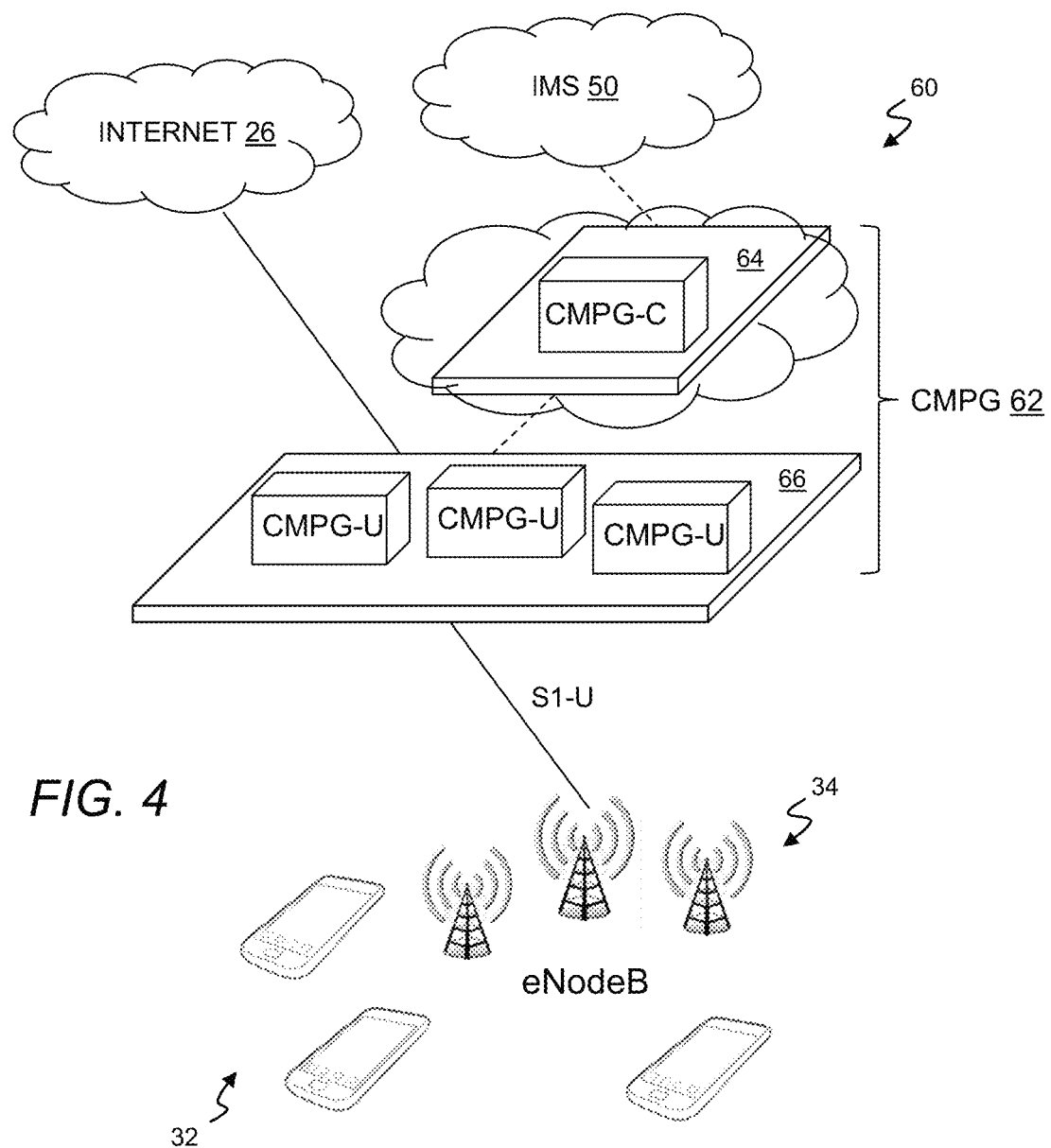
FIG. 4 is a simplified network architecture diagram of an exemplary Evolved Packet Core (EPC) network employing a Converged Media Packet Gateway (CMPG) according to the teachings of the present disclosure.

FIG. 4 is a simplified network architecture diagram of an exemplary Evolved Packet Core (EPC) network 60 employing a Converged Media Packet Gateway (CMPG) 62 according to the teachings of the present disclosure. The CMPG 62 includes the combined functionalities of the SGW, PGW, P-CSCF, ATCF, and ATGW nodes. This new distributed network architecture extends 3GPP R4 architecture to VoLTE by employing a converged media anchor in the form of CMPG 62. The CMPG 62 is divided into a single Converged MPG-Control Plane (CMPG-C) element 64 that manages multiple distributed Converged MPG-User Plane (CMPG-U) elements 66. The distributed architecture enables increased capacity, scalability, and efficiency. This distributed architecture separates the control plane and user plane of the SGW and the PGW, enabling central deployment and operation of GTP-C control signal handling, but distributing the GTP-U media handing to the edge. This distributed architecture enables macro wireless, WiFi, and wireline connectivity to the IMS to be unified in processing. This design implements Software Defined Networking (SDN) with Network Function Virtualization (NFV) to separate the control and user data traffic. The control of the data plane is virtualized and abstracted to allow network and application evolution without the need for upgrades of network devices. This architecture reduces VoLTE hops and also decreases costs associated with hardware and software. Network operators benefit from cost efficient handling of user traffic closest to the users without expensive and delay/jitter-prone backhaul, and without incurring the cost and inefficiency of having to deploy multiple complex bearer plane network nodes in every region.

Figure 5:
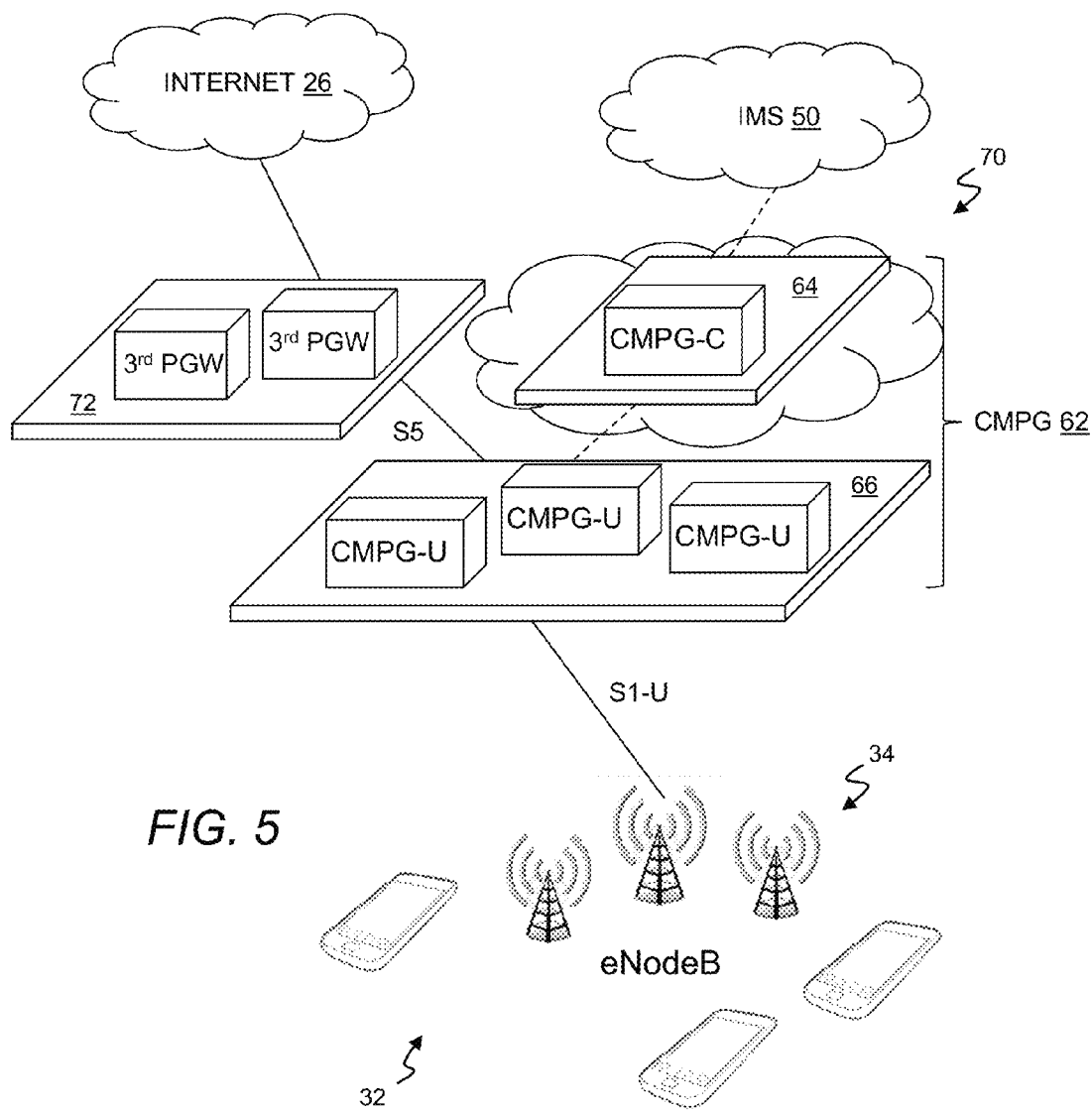
FIG. 5 is a simplified network architecture diagram of an exemplary Evolved Packet Core (EPC) network with a Converged Media Packet Gateway (CMPG) deployed with third party or external Internet Packet Data Network Gateway (PDN GW or PGW) according to the teachings of the present disclosure.

FIG. 5 is a simplified network architecture diagram of an exemplary Evolved Packet Core (EPC) network 70 with a Converged Media Packet Gateway (CMPG) 62 deployed with third party or external Internet Packet Data Network Gateway (PDN GW or PGW) 72 according to the teachings of the present disclosure. As seen in FIG. 5, the third party PGW nodes 72 may be coupled to the CMPG-U 66.

Figure 6:
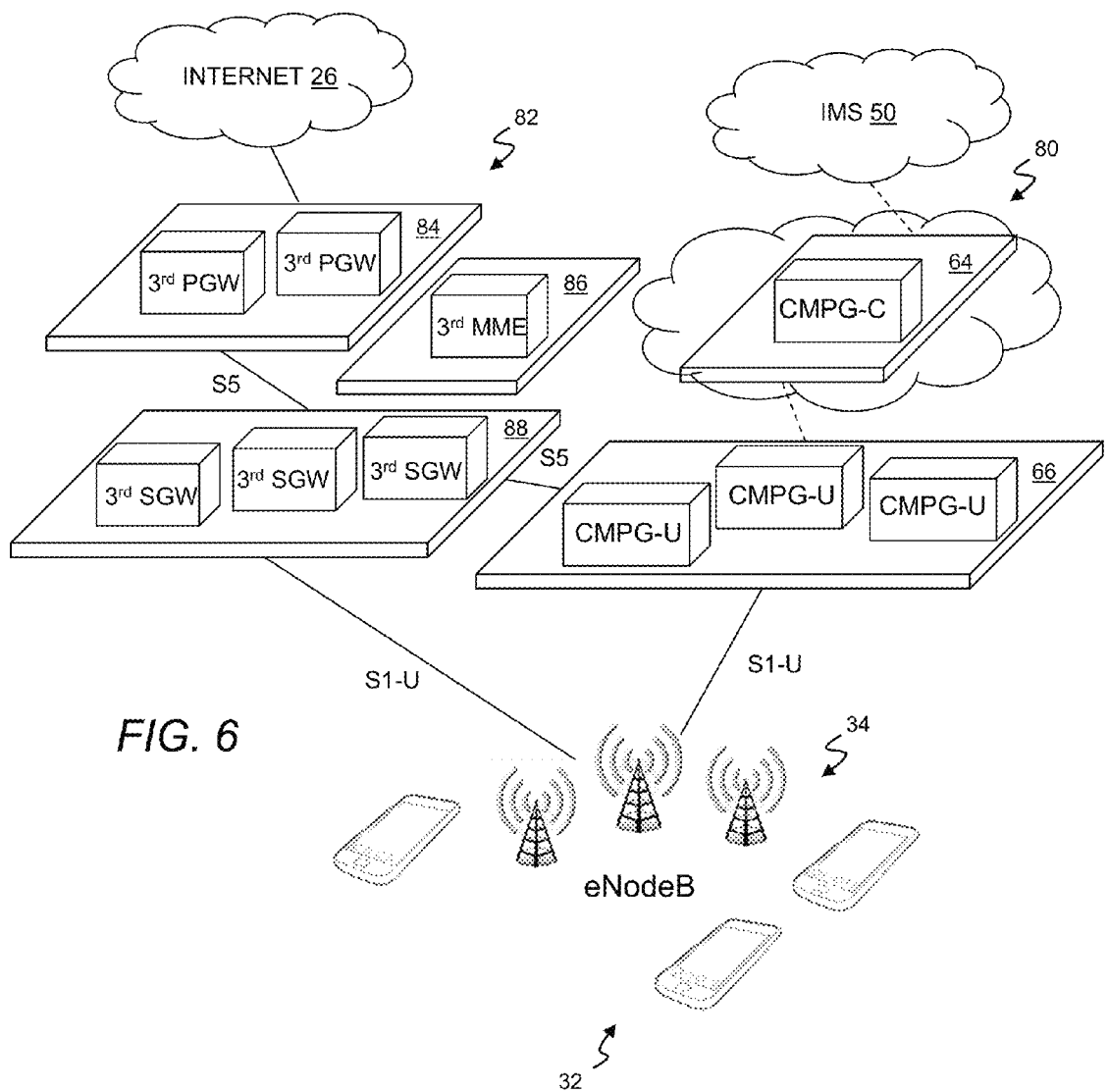
FIG. 6 is a simplified network architecture diagram of an exemplary Evolved Packet Core (EPC) network with a Converged Media Packet Gateway (CMPG) overlay of an existing EPC as IP-Multimedia Subsystem (IMS) PGW according to the teachings of the present disclosure.

FIG. 6 is a simplified network architecture diagram of an exemplary Evolved Packet Core (EPC) network 80 with a Converged Media Packet Gateway (CMPG) 62 overlay of an existing EPC 82 according to the teachings of the present disclosure. The existing or third party EPC 82 includes the conventional PGW 84, MME 86, and SGW 88. The CMPG 62 may function as an IP-Multimedia Subsystem (IMS) PGW to the third party EPC 82.

Figure 7:
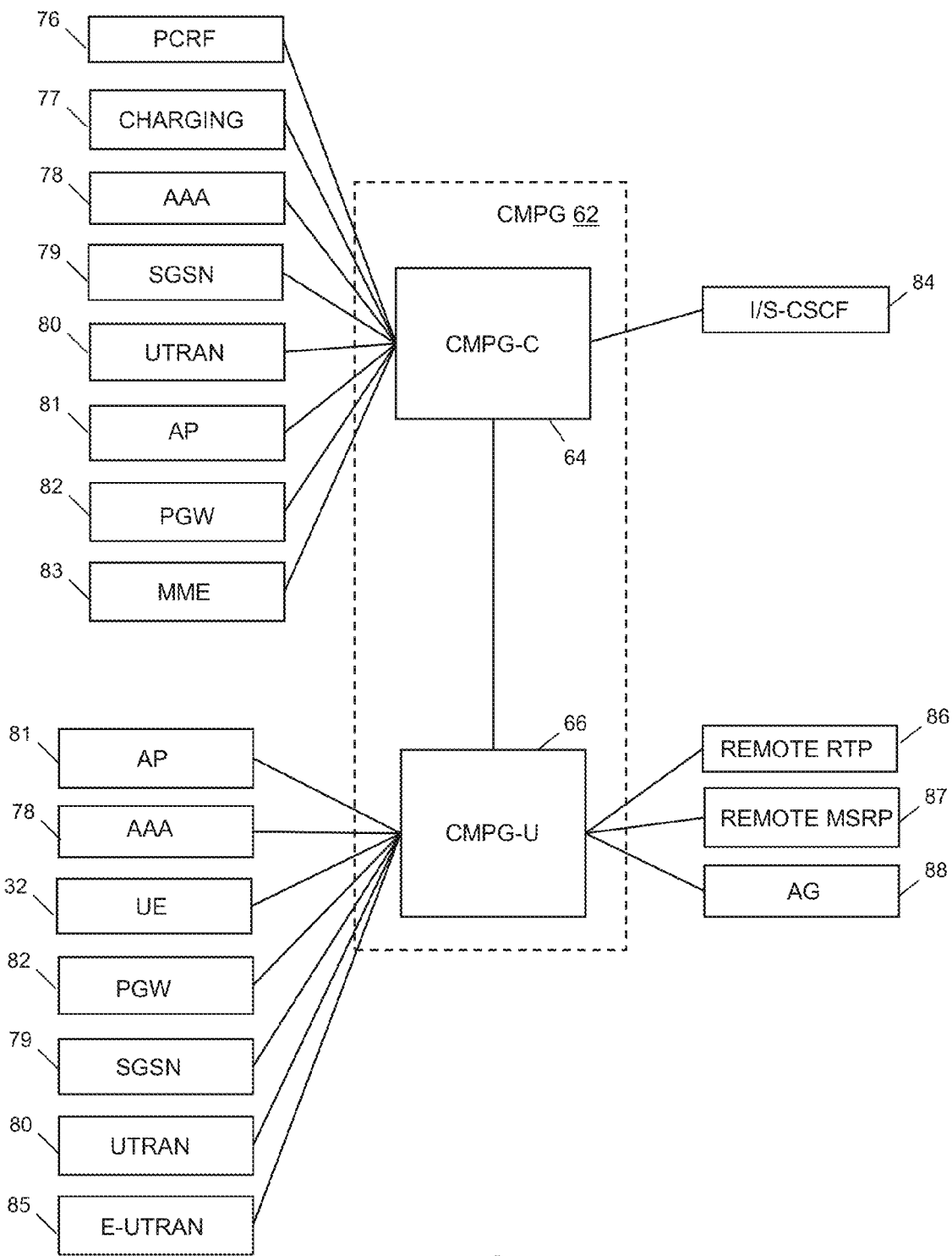
FIG. 7 is a simplified block diagram of the Converged Media Packet Gateway (CMPG) showing its connectivity to other network nodes or functions in the network according to the teachings of the present disclosure.

FIG. 7 is a simplified block diagram of the Converged Media Packet Gateway (CMPG) showing its connectivity to other network nodes or functions in the network according to the teachings of the present disclosure. As set forth above, the CMPG-C 64 is a centralized deployment, whereas the plurality of CMPG-U nodes 74 are intended to be deployed close to the users. The CMPG-C 64 is coupled to a Policy and Charging Rules Function (PCRF) 76, Charging Function 77, Authentication Authorization and Accounting (AAA) 78, Serving GPRS Support Node (SGSN) 79, Universal Terrestrial Radio Access Network (UTRAN) 80, Access Point (AP) 81, Packet Data Network (PDN) Gateway (PGW) 82, Mobility Management Entity (MME) 83, and Interrogating/Serving-Call Session Control Function (I/S-CSCF) 84. More than one element of the CMPG-C 64 may be coupled to some of these elements/functions via different interfaces to convey different information.

The CMPG-U 66 is coupled to Access Point (AP) 81, Authentication Authorization and Accounting (AAA) 78, the UE 32, Packet Data Network (PDN) Gateway (PGW) 82, Serving GPRS Support Node (SGSN) 79, Universal Terrestrial Radio Access Network (UTRAN) 80, Evolved UMTS Terrestrial Radio Access Network (E-UTRAN) 85, a remote RTP (Real-Time Protocol) end point 86, a remote MSRP (Message Session Relay Protocol) end point 87, and an Application Gateway (AG) 88. More than one element of the CMPG-U 66 may be coupled to some of these elements/functions via different interfaces to convey different information.

Figure 8:
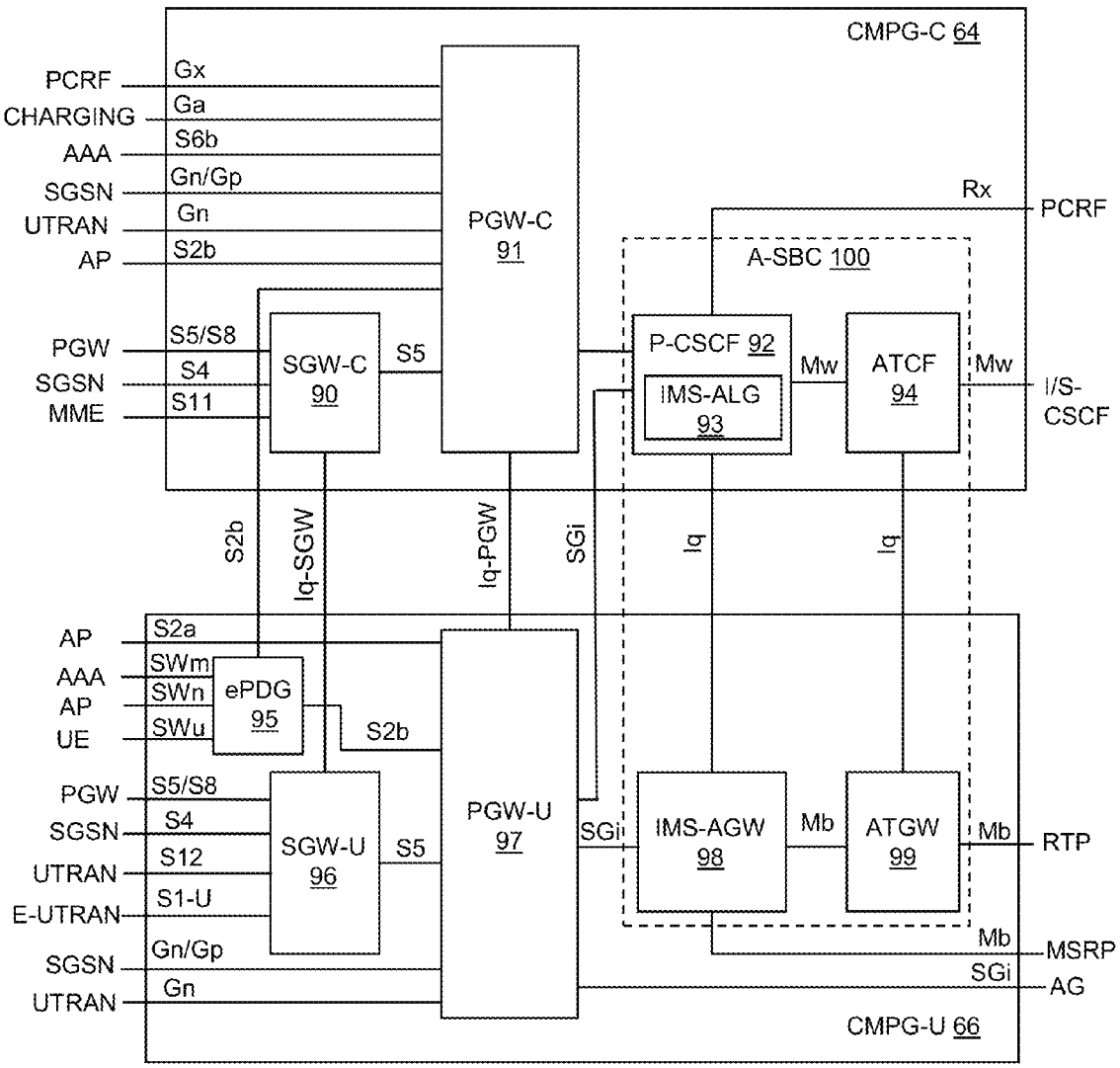
FIG. 8 is a more detailed block diagram of the Converged Media Packet Gateway (CMPG) 62 according to the teachings of the present disclosure.

FIG. 8 is a more detailed block diagram of the Converged Media Packet Gateway (CMPG) 62 according to the teachings of the present disclosure. The CMPG 62 is divided into the control plane and user plane, CMPG-C 64 and CMPG-U 66. The CMPG-C and CMPG-U entities 72 and 74 reside on different network elements or nodes, where the CMPG-C is a centralized node and the CMPG-U nodes are geographically distributed closer to the edge near the users. The CMPG-C 64 typically controls one or more CMPG-U 66, and the interaction between them may use a proprietary protocol based on the standard H.248 protocol. The bearer (user data) flows through the CMPG-U 66 and the CMPG-C 64 participates only in the signaling flow.

The CMPG-C 64 includes the control plane elements SGW-C 90, PGW-C 91, and P-CSCF (Proxy Call Session Control Function) 92, IMS-ALG (Application Level Gateway) 93, and ATCF (Access Transfer Control Function) 94. The CMPG-U 66 includes the user plane elements ePDG 95, SGW-U 96, PGW-U 97, IMS-AGW (Access Gateway) 98, and ATGW (Access Transfer Gateway) 99.

The P-CSCF 92 is the first IMS node encountered when a UE (User Equipment) is trying to establish a VoLTE call. The P-CSCF locates an Interrogating-CSCF (I-CSCF) for the user and the I-CSCF in turn locates a Serving-CSCF (S-CSCF) for the user.

The ATCF 94 acts as a media gateway controller for the ATGW 99. The ATGW 99 acts as an anchor for the IMS media traffic to allow it to be switched quickly form the PS access network to the CS access network via the MSC.

The IMS-AGW 98 performs the functions of media flow firewalling, filtering, bandwidth control and steering, media flow security, media flow encryption, media flow interworking (SRTP-RTP, MSRP-MSRPS, IPv6-IPv4), and lawful media intercept. The P-CSCF 92, ATCF 94, IMS-AGW 98, and ATGW 99 are collectively referred to as the Access Session Border Controller (A-SBC) 100. When operating in access network environments the IMS SBC supports the application layer gateway (ALG) access gateway (AGW) specifications.

It may be seen that the PGW is divided into a control part and a user part. The PGW-C 91 as a part of the CMPG-C 64 may be implemented, for example, as a component of the Advanced Telecommunications Computing Architecture (ATCA) hardware or on a virtualized platform. The CMPG 62 includes one CMPG-C 64 and multiple CMPG-U 66 residing on different network nodes. The CMPG-C 64 selects a particular CMPG-U node suitable for the LTE attach procedure for a particular UE. The PGW-C 91 is the component or function that makes this selection. The LTE default bearer and the LTE dedicated bearer handling are performed by the CMPG-U node selected by the PGW-C 91. In general, the PGW-C 91 is responsible for PDN connectivity, IP address allocation, accounting, uplink and downlink service gate control, and uplink and downlink rate enforcement.

For the same UE, the same selected CMPG-U node also performs the IMS-AGW 98 and ATGW 99 functionalities. This restricts media handling to the selected CMPG-U node and avoids using other CMPG-U nodes. The IMS-ALG 93 uses the UE IP address to obtain the address of the CMPG-U to be used for handling the call. As the ATCF 94 is not aware of the actual UE IP address due to the NAT operation of the UE IP address by the IMS-ALG 93, the ATCF 94 uses internal communication towards the IMS-ALG 93 to obtain the CMPG-U address. Operating in this manner, the PGW-C 91, IMS-ALG 93, and ATCF 94 within the CMPG-C 64 have corresponding user plane functions, PGW-U 97, IMS-AGW 98, and ATGW 99, in the CMPG-U node.

The PGW-C 91 preferably includes a number of function modules implemented as hardware and/or software, such as pgwMgr, gtpCMgr, pcefMgr, ipPoolMgr, mpgcResourceMgr, dhcpClientMgr, diamMgr, h248Mgr, and cdrLogger.

The pgwMgr function module is responsible to maintain the UE session for multiple PDNs. It is responsible for managing the bearer tunnel with the UE and mediating the PCC provisioning with PCRF for the bearer. This function is also responsible for allocating the IP address for the UE and maintaining charging records for PDN connectivity. The pgwMgr instructs the CMPG-U 74 to create GTP-U tunnel(s) with the SGW/ePDG during the initial attach process. It also instructs the release of GTP-U tunnel(s) individually or collectively based on relocation, dedicated bearer deactivation, or PDN disconnection.

GTP-U is a relatively simple IP-based tunneling protocol which permits multiple tunnels between each set of end points. When used in the UMTS, each subscriber has one or more tunnel, one for each PDP context that they have active, as well as possibly having separate tunnels for specific connections with different quality of service requirements. The separate tunnels are identified by a TEID (Tunnel Endpoint Identifier) in the GTP-U messages, which should be a dynamically allocated random number.

The GTPv1-U protocol is used to exchange user data over GTP tunnels across the Sx interfaces. An IP packet for a UE is encapsulated in a GTPv1-U packet and tunneled between the PGW and the eNodeB for transmission with respect to a UE over S1-U and S5/S8 interfaces.

The gtpCMgr function is responsible for allocating and maintaining the Tunnel Endpoint Identifier (TEID) for bearer contexts as well as managing the Path created with SGWs and ePDGs. This function is also responsible for forwarding the GTP-C messages to the pgwMgr. This function embeds the GTPv2-C protocol stack.

The GTP-C protocol is the control section of the GTP standard. When a subscriber requests a PDP context, the SGSN will send a create PDP context request GTP-C message to the GGSN giving details of the subscriber's request. The GGSN will then respond with a create PDP context response GTP-C message which will either give details of the PDP context actually activated or will indicate a failure and give a reason for that failure.

The eGTP-C (or, GTPv2-C) protocol is responsible for creating, maintaining and deleting tunnels on multiple Sx interfaces. It is used for the control plane path management, tunnel management and mobility management. It also controls forwarding relocation messages; SRNS context and creating forward tunnels during inter LTE handovers.

The pcefMgr is responsible for maintaining the PCC rules for bearer contexts. This function is responsible for initiating the IPCAN session messages on behalf of pgwMgr and pass the result of the operation. This function performs PCRF selection for dynamic policies.

The ipPoolMgr is responsible for maintaining the IP Pool (if configured locally). It further directs to get the IP address from Dynamic Host Configuration Protocol (DHCP) server if configured in DHCP mode of IP address allocation with DHCP server address.

The mpgcResourceMgr is responsible for keeping track of a restart counter for the PGW. After each complete failure, it increments the value of the restart counter and sends it to the SGW and ePDG in echo request/response messages.

The dhcpClientMgr is responsible for getting the DHCP IP stateless on behalf of the pgwMgr as instructed by the ipPoolMgr. This function also performs as a DHCP client and obtains the DHCP address for the UE in fast mode.

The diamMgr is an existing process that is enhanced for Gx interface to connect with the PCRF. It may be enhanced to support S6b interface to connect with external AAA server/proxy.

The h248Mgr is responsible for sending the H.248 messages from pgwMgr to the PGW user plane. The h248Mgr maintains information related to Contexts and Terminations.

The dnsResolver function provides an interface to the application processes for performing Domain Name System (DNS) queries to select PCRF.

The cdrLogger function provides an interface to send the Call Detail Record (CDR) to the CDR server. It may be enhanced to support PGW CDR for the Ga interface.

Referring also to FIG. 7, the SGW-C 90 preferably includes an S5/S8 interface to third party or external PGW 82, an S4 interface to the SGSN 79, and an S11 interface to the MME 83. A control channel, Iq, using a proprietary protocol based on the H.248 or Gateway Control Protocol (Megaco), is used to convey information between the CMPG-C 64 and the CMPG-U 66. The H.248 is a standard protocol typically used for a physically distributed multimedia gateway to enable the separation of call control from media conversion. The Iq protocol may also be based on the Openflow standard based on Software Defined Networks (SDN) principles. Other suitable protocols may be used. CMPG-U. A control association is a communication relationship whereby a CMPG-C is controlling a CMPG-U. This control association is instantiated via registration (using, e.g., standard register request and response in H.248 Service Condition Change Command) and it is terminated by the CMPG-U going Out-of-Service. In the CMPG architecture, multiple of these control associations will share the same control channel or connection.

The SGW-C 90 also includes an Iq-SGW interface to the SGW-U in the CMPG-U 66 and an S5 interface to the PGW-C 91. The PGW-C 91 preferably includes a Gx interface to the PCRF 76, a Ga interface to the charging function 77, a S6b interface to the AAA 78, a Gn interface to the UTRAN 80, and an S2b interface to the AP 81. The PGW-C 91 further includes an S2b interface to an ePDG 95 in the CMPG-U 66. The P-CSCF 92 and IMS-ALG 92 include a Session Traversal Utilities for NAT (STUN) interface to the PGW-C 91, an SGi interface to the PGW-U 97, and a Rx interface to the PCRF 76. The P-CSCF 92 also includes a Mw interface to the ATCF 94, and an Iq interface to the IMS-AGW 98 in the CMPG-U 66. The ATCF 94 further includes an Iq interface to the ATGW 99 and a Mw interface to the I/S-CSCF 84.

In the CMPG-U 66, the ePDG 95 includes an SWm interface to AAA 78, an SWn interface to the AP 81, an SWu interface to the UE 32, and an S2b interface to the PGW-U 97. The SGW-U 96 includes an S5/S8 interface to the PGW, an S4 interface to the SGSN 79, an S12 interface with the UTRAN 80, an S1-U interface to the E-UTRAN 85, and an S5 interface to the PGW-U 97. The PGW-U 97 further includes a Gn/Gp interface to the SGSN 79, a Gn interface to the UTRAN 80, and an SGi interface to the AG 88. The IMS-AGW 98 includes a Mb interface to the ATGW 99, and a Mb interface to the remote MSRP end point 87. The ATGW 99 also includes a Mb interface to the remote RTP end point 86.

The CMPG-C 64 manages the GTP-C function of the SGW, P-CSCF, SBC, and ATCF. Each CMPG-U element 74 functions as SGW bearer plane terminating S1-U, ATGW, and IMS AGW NAT (Network Address Translation) functions. The CMPG 62 as described herein is the solution for efficient and cost effective VoLTE deployment. This arrangement keeps the voice bearers local similar to R4 MSC/MGW, and deploys CMPG-U next to MGW. This arrangement further enables mobility, WiFi access including seamless WiFi to LTE handover and inbound and outbound roamers to access separate PGW if required.

Figure 9:
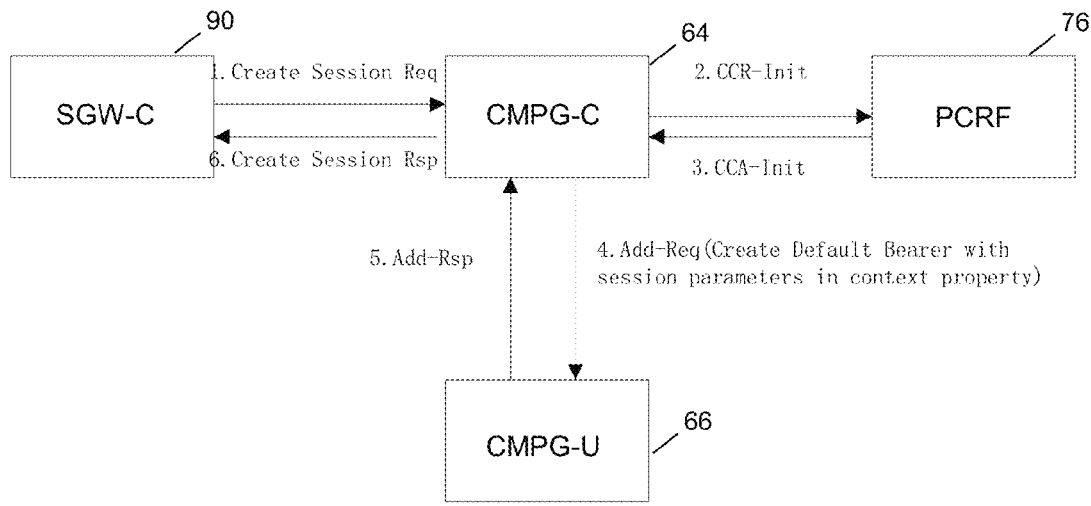
FIG. 9 shows an exemplary flow diagram for a UE attachment process according to the teachings of the present disclosure.

FIG. 9 shows an exemplary flow diagram for a UE attachment process according to the teachings of the present disclosure. The SGW-C sends a Create Session Request to the CMPG-C. The CMPG-C in turn sends a CCR-Init (Credit Check Request) message to the PCRF. The PCRF returns a CCA-Init (Credit Check Answer) message to the CMPG-C. The CMPG-C further sends a default bearer Add Request with session parameters in context property to the CMPG-U. The CMPG-U returns an Add-Response message. Before the CMPG-U responds successfully, both session and default bearers are created. The CMPG-C returns a Create Session Response message to the SGW-C.

Figure 10:
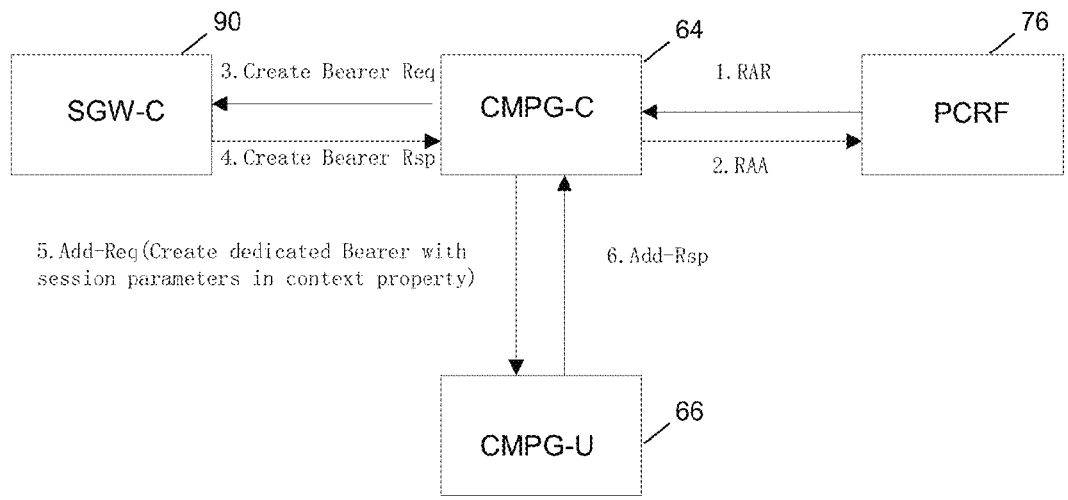
FIG. 10 shows an exemplary flow diagram for a dedicated bearer activation process according to the teachings of the present disclosure.

FIG. 10 shows an exemplary flow diagram for a dedicated bearer activation process according to the teachings of the present disclosure. The PCRF sends a Re-Auth Request (RAR) message to the CMPG-C, and the CMPG-U returns a Re-Auth Answer (RAA). The CMPG-C sends a Create Bearer Request to the SGW-C, and the SGW-C returns a Create Bearer Response to the CMPG-C. The CMPG-C in turn sends a dedicated bearer Add Request with session parameters in context property to the CMPG-U. The CMPG-U returns an Add-Response message. Before the CMPG-U responds successfully, a dedicated bearer is created and the session is updated.

Figure 11:
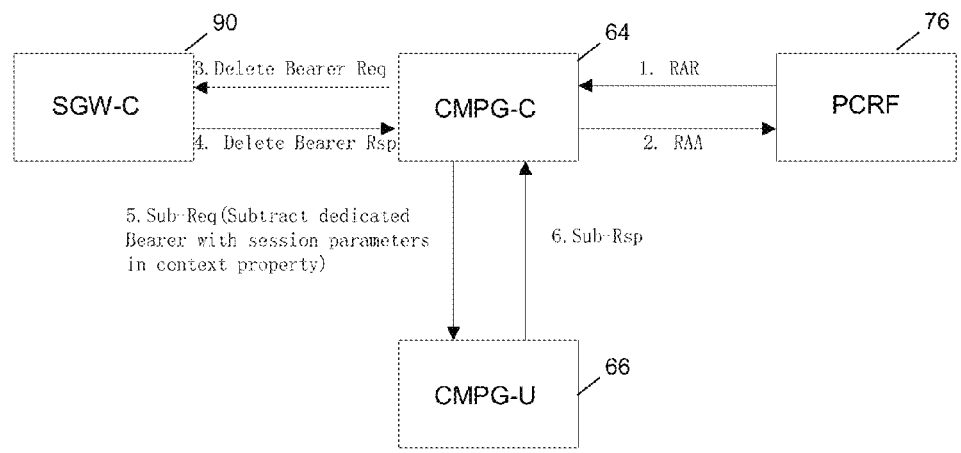
FIG. 11 shows an exemplary flow diagram for a session deletion process according to the teachings of the present disclosure.

FIG. 11 shows an exemplary flow diagram for a session deletion process according to the teachings of the present disclosure. The SGW-C sends the CMPG-C a Delete Session Request message, and the CMPG-C sends a Sub-Request message to the CMPG-U. In response, the CMPG-U sends a Sub-Response message back to the CMPG-C, which in turn sends a Delete Session Response to the SGW-C.

Figure 12:
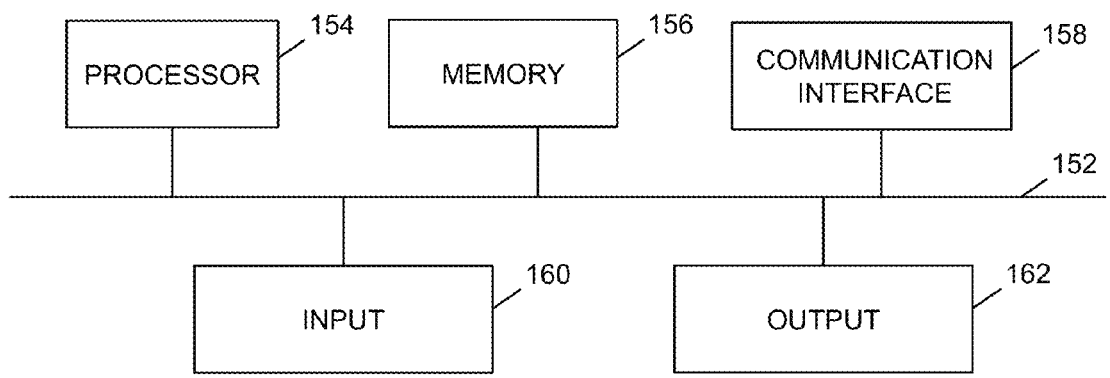
FIG. 12 is a simplified block diagram of an exemplary embodiment of a network node of an Evolved Packet System (EPS) according to the present disclosure.

Referring to FIG. 12, an exemplary network node described herein may include a bus 152 interconnecting a processor 154, a memory 156, a communication interface 158, an input device 160, and an output device 162. The bus 152 enables communication among the components of network node 150. The processor 154 may include one or more processing units or microprocessors that interpret and execute coded instructions. In other implementations, the processor 154 may be implemented by or include one or more application-specific integrated circuits (ASICs), field programmable gate arrays (FPGAs), or the like.

The memory 156 may include a random access memory (RAM) or another type of dynamic storage device that stores information and instructions for execution by the processor 154. The memory 156 may also include a read-only memory (ROM) or another type of static storage device that stores static information and instructions for the processor 154. The memory 156 may further include other types of magnetic or optical recording medium and its corresponding drive for storing information and/or instructions.

The communication interface 158 may include any transceiver-like device and antenna that enables the network node 150 to communicate via radio frequency with other devices and/or systems. The communication interface 158 may further include interfaces, ports, or connectors to other devices.

The input 160 may include one or more devices that permit an operator to enter information to the network node 150, such as a keyboard, a keypad, a mouse, a pen, a touch-sensitive pad or screen, a microphone, one or more biometric mechanisms, and the like. The output 162 may include one or more devices that outputs information to the operator, such as a display, a printer port, a speaker, etc.

As described herein, the network node 150 such as the CMPG-C and CMPG-U may perform certain operations in response to the processor 154 executing software instructions contained in a computer-readable medium, such as memory 156. A computer-readable medium may be defined as a physical or logical memory device. A logical memory device may include memory space within a single physical memory device or spread across multiple physical memory devices. The software instructions may be read into memory 156 from another computer-readable medium or from another device via a communication interface 158. The software instructions contained in the memory 156 may cause processor 154 to perform processes described herein. Alternatively, hardwired circuitry may be used in place of or in combination with software instructions to implement processes described herein. Thus, implementations described herein are not limited to any specific combination of hardware circuitry and software.

The features of the present invention which are believed to be novel are set forth below with particularity in the appended claims. However, modifications, variations, and changes to the exemplary embodiments described above will be apparent to those skilled in the art, and the system and method described herein thus encompass such modifications, variations, and changes and are not limited to the specific embodiments described herein.

GLOSSARY

AAA (Authentication Authorization and Accounting)
AGW (Access Gateway)
ALG (Application Level Gateway)
AG (Application Gateway)
AP (Access Point)
A-SBC (Access Session Border Controller)
ATCA (Advanced Telecommunications Computing Architecture)
ATCF (Access Transfer Control Function)
ATGW (Access Transfer Gateway)
CCA (Credit Check Answer)
CCR (Credit Check Request)
CDMA (Code Division Multiple Access)
CDR (Call Detail Record)
CMPG (Converged Media Packet Gateway)
CS (Circuit Switched)
CSCF (Call Session Control Function)
DHCP (Dynamic Host Configuration Protocol)
DL (Downlink)
DNS (Domain Name System)
EPC (Evolved Packet Core)
eNodeB (Evolved Node B)
E-UTRAN (Evolved UMTS Terrestrial Radio Access Network)
FDMA (Frequency Division Multiple Access)
GGSN (Gateway GPRS Support Node)
GPRS (General Packet Radio Service)
GSM (Global System for Mobile Communications)
GTP (GPRS (General Packet Radio Service) Tunneling Protocol)
HRPD (High Rate Packet Data)
HSGW (HRPD Serving Gateway)
HSPA (High Speed Packet Access)
I-CSCF (Interrogating-Call Session Control Function)
IMS (IP-Multimedia Subsystem)
IP (Internet Protocol)
ITU (International Telecommunications Union)
LTE (Long Term Evolution)
MGW (Media Gateway)
MME (Mobility Management Entity)
MSC (Mobile Switching Center)
MSRP (Message Session Relay Protocol)
NAT (Network Address Translation)
NFV (Network Function Virtualization)
OFDMA (Orthogonal FDMA)
PCC (Policy Charging Control)
PCEF (Policy and Charging Enforcement Function)
PCRF (Policy and Charging Rules Function)
P-CSCF (Proxy Call Session Control Function)
PDN GW (Packet Data Network Gateway)
PDP (Packet Data Protocol)
PGW (Packet Data Network (PDN) Gateway)
POP (Point of Presence)
Real-Time Protocol (RTP)
SAE (System Architecture Evolution)
SBC (Session Border Controller)
S-CSCF (Serving-Call Session Control Function)
SDN (Software Defined Networking)
SGSN (Serving GPRS Support Node)
SGW (Serving Gateway)
SRVCC (Single Radio Voice Call Continuity)
STUN (Session Traversal Utilities for NAT)

TDMA (Time Division Multiple Access)
TEID (Tunnel Endpoint Identifier)
UE (User Equipment)
UL (Uplink)
UMTS (Universal Mobile Telecommunication System)
UTRA (Universal Terrestrial Radio Access)
UTRAN (Universal Terrestrial Radio Access Network)
VoLTE (Voice over LTE)
W-CDA (Wideband-CDM)
W-CDMA (Wideband Code Division Multiple Access)

What is claimed is:

1. An Evolved Packet Core network comprising:
a converged media packet gateway control plane comprising a converged media packet gateway control element including a control general packet radio service tunneling protocol (GTP-C) function of serving gateway (SGW), packet data network (PDN) gateway (PGW), proxy call session control function (P-CSCF) and access transfer control function (ATCF) functions; and
a converged media packet user plane comprising a plurality of converged media packet gateway bearer elements disposed remotely from the converged media packet gateway control element, in communication and under the management of the converged media packet gateway control element,
wherein at least one converged media packet gateway bearer element comprises SGW and PGW bearer plane terminating S1-U interfaces, and access transfer gateway (ATGW) and Internet protocol multimedia subsystem-access gateway-network address translation (IMS-AGW NAT) functions;
wherein user data flows through the converged media packet user plane;
wherein signaling information flows through the converged media packet gateway control plane; and
wherein the converged media packet gateway control element is a centralized node and the converged media packet gateway bearer elements are geographically distributed closer to an edge of the network.

2. The network of claim 1, wherein the converged media packet gateway control element comprises:
an SGW control portion;
a PGW control portion coupled to the SGW control portion;
a P-CSCF element coupled to the PGW control portion, the P-CSCF including an IMS-application level gateway (IMS-ALG) function; and
an ATCF element coupled to the P-CSCF element.

3. The network of claim 1, wherein the converged media packet gateway bearer element comprises:
an evolved packet data gateway (ePDG) function;
an SGW bearer portion;
a PGW bearer portion coupled to the SGW bearer portion;
an IMS-AGW element coupled to the PGW bearer portion; and
an ATGW element coupled to the IMS-AGW element.

4. The network of claim 1, wherein the converged media packet gateway control element comprises a Gx interface and an Rx interface to a policy and charging rules function (PCRF).

5. The network of claim 1, wherein the converged media packet gateway control element comprises a Ga interface to a charging function.

6. The network of claim 1, wherein the converged media packet gateway control element comprises a S6b interface to an authentication authorization and accounting (AAA) function.

7. The network of claim 1, wherein the converged media packet gateway control element comprises a Gn/Gp interface and an S4 interface to a serving general packet radio service support node (SGSN).

8. The network of claim 1, wherein the converged media packet gateway control element comprises a Gn interface to a universal terrestrial radio access network (UTRAN).

9. The network of claim 1, wherein the converged media packet gateway control element comprises an S2b interface to an access point (AP).

10. The network of claim 1, wherein the converged media packet gateway control element comprises an S5/S8 interface to an external PGW.

11. The network of claim 1, wherein the converged media packet gateway control element comprises an S11 interface to a mobility management entity (MME).

12. The network of claim 1, wherein the converged media packet gateway control element comprises a Mw interface to an interrogating/serving call session control function (I/S-CSCF) I/S CSCF.

13. The network of claim 1, wherein the at least one converged media packet gateway bearer element comprises an S2a interface and an SWn interface to an access point (AP).

14. The network of claim 1, wherein the at least one converged media packet gateway bearer element comprises an SWm interface to an authentication authorization and accounting (AAA) function.

15. The network of claim 1, wherein the at least one converged media packet gateway bearer element comprises an SWu interface to a user equipment (UE).

16. The network of claim 1, wherein the at least one converged media packet gateway bearer element comprises an S5/S8 interface to an external PGW.

17. The network of claim 1, wherein the at least one converged media packet gateway bearer element comprises an S4 interface and a Gn/Gp interface to an SGSN.

18. The network of claim 1, wherein the at least one converged media packet gateway bearer element comprises an S12 interface and a Gn interface to a UTRAN.

19. The network of claim 1, wherein the at least one converged media packet gateway bearer element comprises an S1-U interface to an evolved universal mobile telecommunication system terrestrial radio access network (E-UTRAN).

20. The network of claim 1, wherein the at least one converged media packet gateway bearer element comprises an Mb interface to a remote real-time protocol (RTP) and a remote message session relay protocol (MSRP).

21. The network of claim 1, wherein the at least one converged media packet gateway bearer element comprises an SGi interface to an application gateway (AG).

22. The network of claim 1, wherein the converged media packet gateway control element communicates with the at least one converged media packet gateway bearer element via a control channel using a protocol based on the H.248 protocol.

23. A distributed Evolved Packet Core network element comprising: a gateway control element including:
a Serving Gateway (SGW) control portion;
a Packet Data Network (PDN) Gateway (PGW) control portion coupled to the SGW control portion;

a proxy call session control function (P-CSCF) element coupled to the PGW control portion, the P-CSCF including an IP-Multimedia Subsystem Application Level Gateway (IMS-ALG) function; and an Access Transfer Control Function (ATCF) element coupled to the P-CSCF element; and a plurality of gateway bearer elements distributed geographically and each coupled to the gateway control element, each of the gateway bearer elements including:

an evolved Packet Data Gateway (ePDG) function;

an SGW bearer portion;

a PGW bearer portion coupled to the SGW bearer portion;

an Internet protocol multimedia subsystem-access gateway (IMS-AGW) element coupled to the PGW bearer portion; and an access transfer gateway (ATGW) element coupled to the IMS-AGW element, wherein the distributed evolved packet core network element enables central deployment and operation of control signal handling using the gateway control element and distributed media handling using the plurality of gateway bearer elements.

24. The network element of claim 23, wherein the gateway control element comprises:

a Gx interface and an Rx interface to a policy and charging rules function (PCRF);

a Ga interface to a charging function;

a S6b interface to an authentic authorization and accounting (AAA) function;

a Gn/Gp interface and an S4 interface to a serving GPRS support node (SGSN);

a Gn interface to a universal terrestrial radio access network (UTRAN);

an S2b interface to an access point (AP);

an S5/S8 interface to an external PGW;

an S11 interface to a mobility management entity (MME); and a Mw interface to an interrogating/serving call session control function (I/S-CSCF).

25. The network element of claim 23, wherein each of the gateway bearer element comprises:

an S2a interface and an SWn interface to an access point (AP);

an SWm interface to an authentic authorization and accounting (AAA) function;

an SWu interface to a user equipment (UE);

an S5/S8 interface to an external PGW;

an S4 interface and a Gn/Gp interface to a serving GPRS support node (SGSN);

an S12 interface and a Gn interface to a universal terrestrial radio access network (UTRAN);

an SI-U interface to an evolved UMTS terrestrial radio access network (E-UTRAN);

an Mb interface to a remote Real-Time Protocol (RTP) and a remote message session relay protocol (MSRP); and an SGi interface to an application gateway (AG).

26. The network element of claim 23, wherein the gateway control element communicates with the plurality of geographically distributed gateway bearer elements via a control channel using a protocol based on the H.248 protocol.

27. A method of extending 3GPP R4 architecture to a long term evolution (LTE) data and voice core, comprising:

managing a control general packet radio service tunneling protocol (GTP-C) function of Serving Gateway (SGW), Packet Data Network (PDN) Gateway (PGW), proxy call session control function (P-CSCF), and Access Transfer Control Function (ATCF) in a single centralized control element; and providing SGW bearer plane terminating S1-U, Access Transfer Gateway (ATGW), and Internet Protocol multimedia subsystem-access gateway-network address translation (IMS-AGW NAT) functions in a plurality of geographically distributed bearer elements under the control and management of the single centralized control element, wherein a dedicated bearer is activated between the control element and the bearer plane.

* * * * *